(12) United States Patent
Silva (10) Patent No.: US 10,803,302 B2
(45) Date of Patent: Oct. 13, 2020

(54) HUMAN FACIAL DETECTION AND RECOGNITION SYSTEM

(71) Applicant: BLUE LINE SECURITY SOLUTIONS, LLC, St. Louis, MO (US)

(72) Inventor: Marcos Silva, St. Louis, MO (US)

(73) Assignee: BLUE LINE SECURITY SOLUTIONS, LLC, St. Louis, MO (US)

( * ) Notice: Subject to any disclaimer, the term of this patent is extended or adjusted under 35 U.S.C. 154(b) by 0 days.

(21) Appl. No.: 16/557,303

(22) Filed: Aug. 30, 2019

(65) Prior Publication Data

US 2020/0005024 A1     Jan. 2, 2020

Related U.S. Application Data (63) Continuation of application No. 16/352,170, filed on Mar. 13, 2019, now Pat. No. 10,438,055, which is a continuation of application No. 16/148,581, filed on Oct. 1, 2018, now Pat. No. 10,262,192, which is a continuation of application No. 15/031,010, filed as application No. PCT/US2014/062200 on Oct. 24, 2014, now Pat. No. 10,169,644.

(60) Provisional application No. 61/895,029, filed on Oct. 24, 2013.

(51) Int. Cl.
*G06K 9/00* (2006.01)
*G06K 9/62* (2006.01)
*G06K 9/46* (2006.01)

(52) U.S. Cl.
CPC ..... *G06K 9/00288* (2013.01); *G06K 9/00248* (2013.01); *G06K 9/00255* (2013.01); *G06K 9/00268* (2013.01); *G06K 9/4614* (2013.01); *G06K 9/6201* (2013.01); *G06K 9/6209* (2013.01)

(58) Field of Classification Search
None
See application file for complete search history.

(56) References Cited

U.S. PATENT DOCUMENTS

| | | | |
|---|---|---|---|
| 5,774,591 A | 6/1998 | Black et al. | |
| 7,382,244 B1* | 6/2008 | Donovan | G08B 13/19656 340/506 |
| 10,262,192 B2 | 4/2019 | Silva | |
| 2006/0034495 A1 | 2/2006 | Miller et al. | |
| 2006/0078172 A1* | 4/2006 | Zhang | G06K 9/00268 382/118 |
| 2007/0202937 A1 | 8/2007 | Peires et al. | |
| 2009/0175509 A1 | 7/2009 | Gonion et al. | |

(Continued)

OTHER PUBLICATIONS

Dong, Yi, et al., "Towards Pose Robust Face Recognition", IEEE Computer Society Conference on Computer Vision and Pattern Recognition, Proceedings, IEEE Computer Society, US, Jun. 23, 2013, pp. 3539-3545, ISSN: 1063-6919.

(Continued)

*Primary Examiner* — Christopher Braniff
(74) *Attorney, Agent, or Firm* — Polsinelli PC (57) ABSTRACT

Aspects of the present disclosure provide an image-based face detection and recognition system that processes and/or analyzes portions of an image using "image strips" and cascading classifiers to detect faces and/or various facial features, such an eye, nose, mouth, cheekbone, jaw line, etc.

19 Claims, 13 Drawing Sheets

(56) References Cited

U.S. PATENT DOCUMENTS

2011/0063465 A1    3/2011   Nanu et al.
2011/0211036 A1    9/2011   Tran
2011/0299783 A1    12/2011  Chotard et al.

OTHER PUBLICATIONS

Zheng, Wei, et al, "Strip Features for Fast Object Detection", IEEE Transactions on Cybernetics, vol. 43, No. 6, 18 Jan. 18, 2013, pp. 1898-1912, Piscataway, NJ, USA ISSN: 2168-2267.
Supplementary European Search Report, 14855902.4, PCT/US2014062200, dated May 12, 2017, 6 pages.
International Search Report, PCT/US2014/062200, dated Feb. 3, 2015, 1 page.
Notice of Allowance for U.S. Appl. No. 15/031,010 dated Sep. 20, 2018, 7 pages.
Non-Final Office Action for U.S. Appl. No. 15/031,010 dated Jun. 29, 2018, 7 pages.
Final Office Action for U.S. Appl. No. 15/031,010 dated Mar. 12, 2018, 13 pages.
Non-Final Office Action for U.S. Appl. No. 15/031,010 dated Nov. 1, 2017, 14 pages.
Notice of Allowance for U.S. Appl. No. 16/148,581 dated Feb. 25, 2019, 15 pages.
Non-Final Action for U.S. Appl. No. 16/352,170 dated Jul. 22, 2019, 10 pages.
Notice of Allowance for U.S. Appl. No. 16/352,170 dated Aug. 13, 2019, 5 Pages.

\* cited by examiner

HUMAN FACIAL DETECTION AND RECOGNITION SYSTEM

CROSS REFERENCE TO RELATED APPLICATIONS

This application is a continuation of application Ser. No. 16/352,170, entitled "Human Facial Detection and Recognition System," filed on Mar. 13, 2019, which is a continuation of application Ser. No. 16/148,581, entitled "Human Facial Detection and Recognition System," filed on Oct. 1, 2018, which is a continuation of application Ser. No. 15/031,010, entitled "Human Facial Detection and Recognition System," filed on Apr. 21, 2016, which is a national stage application of PCT/US14/62200 filed Oct. 24, 2014, which claims priority from Application No. 61/895,029 filed Oct. 24, 2013, the disclosure of which is incorporated herein by reference.

TECHNICAL FIELD

Aspects of the present disclosure involve human facial detection and recognition.

BACKGROUND

Successful facial recognition technology is a dynamic and exciting possibility. Unfortunately many of its current applications have proven unreliable. Research has shown the methods used during most current applications are not adequate to acquire a high level of accuracy. Poor camera resolution, camera placement, and an insufficient number of cameras lead current facial recognition systems to produce unsatisfactory results during testing and deployment.

Face recognition has become one of the most important biometrics authentication technologies in the past few years. The Blue Line Security Solutions team has worked hard to overcome the two main challenges for accurate and fast face recognition, which are illumination and pose variation. Both of these issues can cause serious performance degradation in a face recognition system. Illumination can change the appearance of an object considerably, and in most cases these differences caused by significant changes in lighting conditions is what makes the task of facial recognition extremely difficult in some cases. The same statement is true for pose variation. These two problematic variables (pose and illumination) significantly cause the degradation of the 2D facial texture mapping of the human face and the overall reduction in the accuracy of the system.

SUMMARY

Aspects of the present disclosure include systems, methods, and/or non-transitory computer readable mediums for detecting a face. The systems, methods, and/or non-transitory computer readable mediums include detecting, using one or more computing devices, at least a portion of a face from at least one image of a sequence of images. The systems, methods, and/or non-transitory computer readable mediums further include generating, using the one or more computing devices, a mapping of facial points corresponding to the at least one image by: generating 180 points on an image plane corresponding to at least one facial feature corresponding to the face; projecting the points from the image plane to a surface of a mean shape; and mirroring the points using facial symmetry. The systems, methods, and/or non-transitory computer readable mediums include identifying, using the one or more computing devices, a match for the mapping of facial points by comparing the mapping of facial points to a recognized image stored in a database.

BRIEF DESCRIPTION OF THE DRAWINGS

The foregoing and other objects, features, and advantages of the present disclosure set forth herein should be apparent from the following description of particular embodiments of those inventive concepts, as illustrated in the accompanying drawings. The drawings depict only typical embodiments of the present disclosure and, therefore, are not to be considered limiting in scope.

DETAILED DESCRIPTION

Aspects of the present disclosure provide an image-based face detection and recognition system that processes and/or analyzes portions of an image using "image strips" and cascading classifiers to detect faces and/or various facial features, such as an eye, nose, mouth, cheekbone, jaw line, etc., from the image. Initially, the disclosed system obtains live, high-definition, video data (or other formats) from one or more cameras in the form of a sequence of images for storage in a database. In one embodiment, a video compression library may be implemented to reduce the size of the sequence of images (or the high-definition video data). The system then applies the image strips and/or the cascade classifiers to the compressed sequence of images to identify pixel shading variations and/or positions within the compressed images that may define the location and size of a face.

Figure 10A:
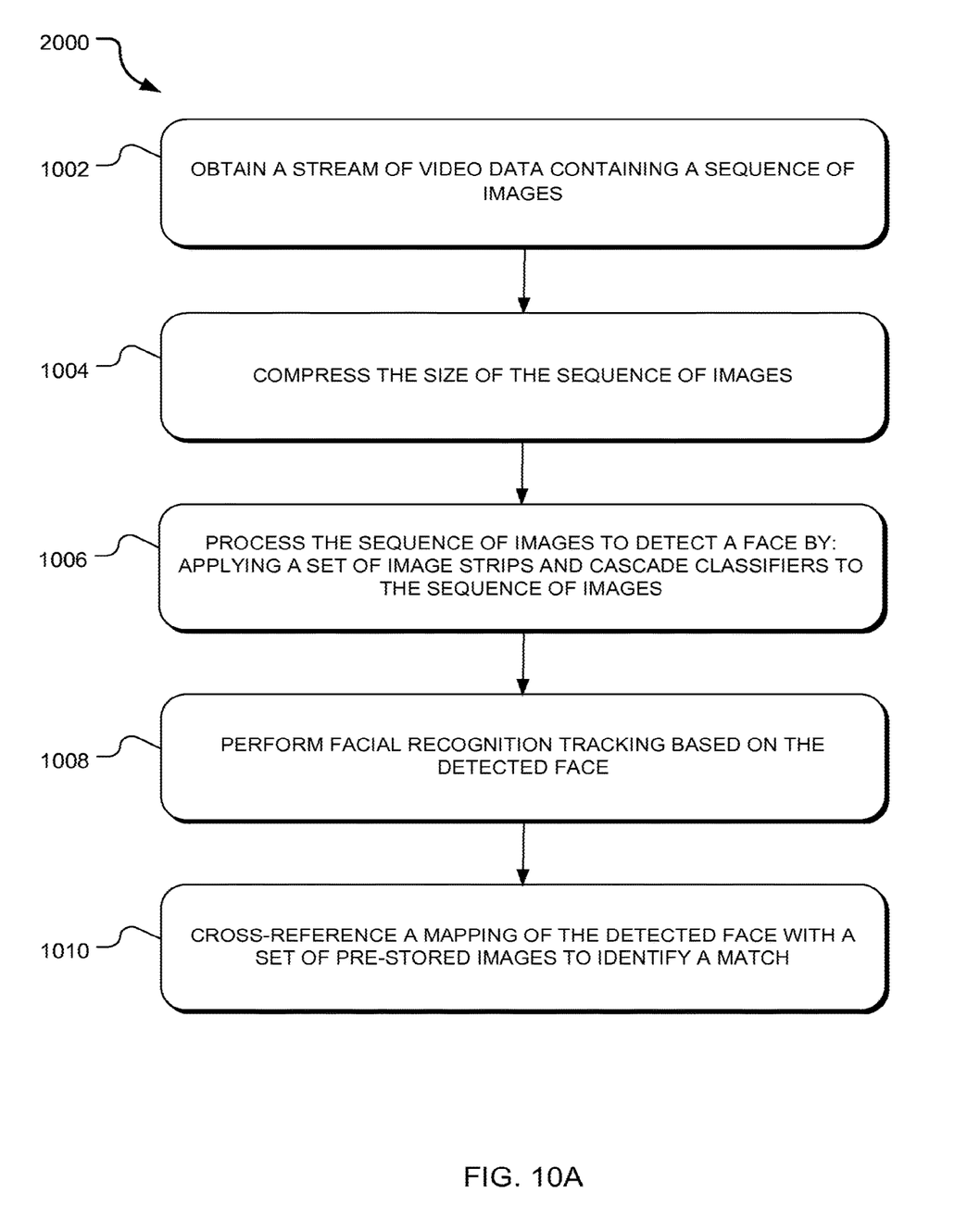
FIG. 10A is a flow chart illustrating a process for detecting and recognizing faces, according to aspects of the present disclosure.
Figure 10B:
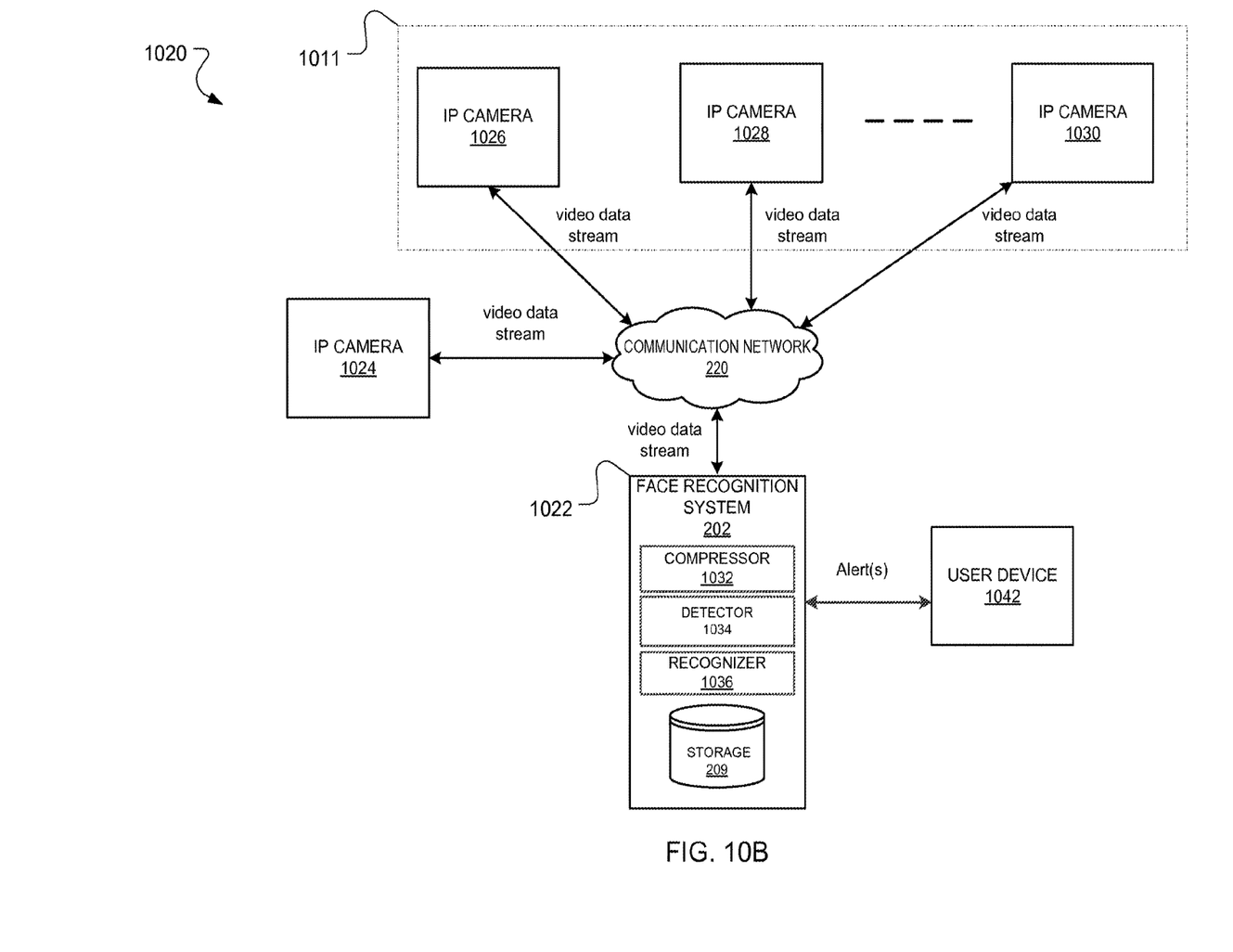
FIG. 10B is a computing architecture that may be used to detect and recognize faces, according to aspects of the present disclosure.

An illustrative process and system for detecting faces from high definition video data using image strip features and cascade classifiers is depicted in FIGS. 10A and 10B, respectively. In particular, FIG. 10A illustrates an example process 1000 for detecting faces from high definition video data using image strips features. FIG. 10B illustrates a face detection and recognition system 1020 including hardware and/or software components that may be used to perform or otherwise execute the process 2000 of FIG. 10A.

Referring now to FIG. 10A, process 2000 begins with obtaining a stream of video data including a sequence of image sequences for use in face detection and face recognition (operation 1002). In particular and as illustrated in FIG. 10B, a face recognition system 1022 may receive high-definition video data from at least two (2) high definition IP cameras 1024-1030 via a communication network 220, which may be Internet, Intranet, or some other network or combination of networks. In one particular embodiment, the at least two IP cameras 1024-1030 may be arranged as a part of surveillance and/or monitoring system 1011 configured to monitor or otherwise capture images of various human interactions.

The face recognition system 1022 processes the obtained high-definition video data to extract a sequence of images, from which a face or portions of a face may be recognized. To capture the sequence of images, in one specific embodiment, the face recognition system 1022 may continuously take or otherwise capture snapshots of the high-definition video stream and store the sequence of snap shot images in a database 209, which may be a database, data store, storage appliance, and/or the like of any suitable type. Although the storage 209 is depicted as being a part of the face recognition system 1022, it is contemplated that the storage 209 may be located external face recognition system 1022, or elsewhere within the communication network 220.

Referring back to FIG. 10A, the sequence of images (e.g., the high-definition video data) may be processed to reduce the size of the images (operation 1004). As illustrated in FIG. 10B, a video compressor 1032 reduces the size of the images by re-using identical video information captured from frame to frame, rather than storing all the data for each frame of video. Stated differently, the video compressor 1032 maintains and re-uses the data from a previous snapshot image (i.e., frame of video) that did not change when storing the next snapshot image. Thus, each new image only contains the data that relates to how the image has changed from the previous image or frame.

Referring again to FIG. 10A, the obtained sequence of images are processed to detect a face, or portions of a face (operation 1006). Referring to FIG. 10B, the video compressor 1032 provides the compressed video data (e.g., the sequence of images) to a detection component 1034 (illustrated as "detector") that detects portions of a face from the sequence of images stored in the database 209. More particularly, the detection component 1034 logically applies a set of image strip features to the sequence of images. Faces typically have relatively consistent characteristics in structure that consist of some basic local elements. The image strip features describe the appearances of those elements.

Figure 1:
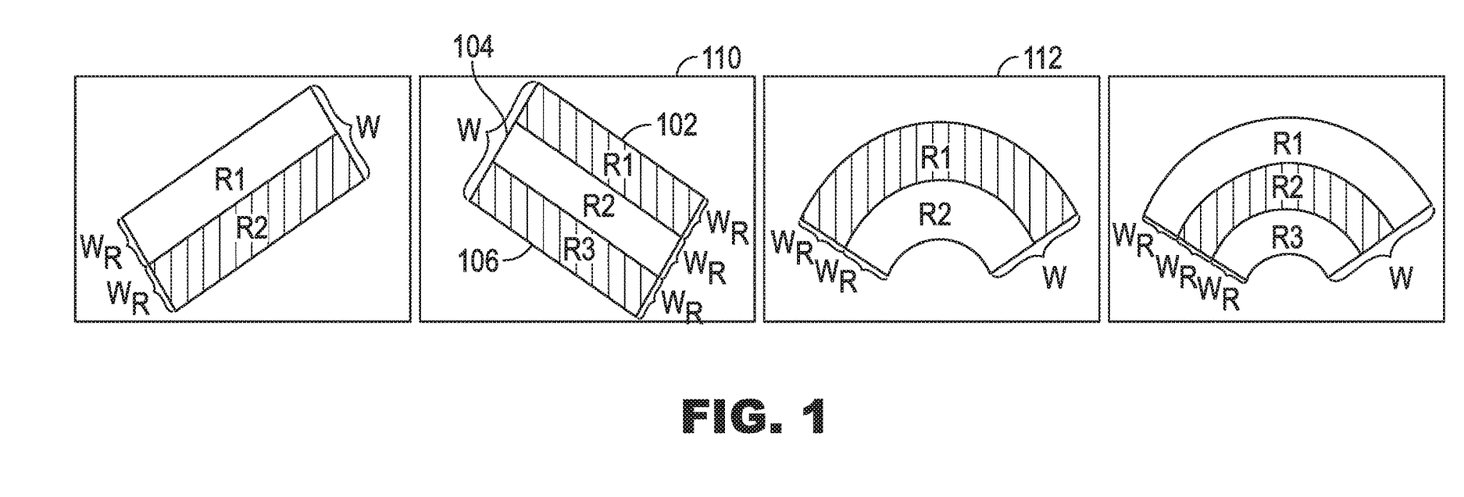
FIG. 1 depicts example image strip features, according to aspects of the present disclosure.

Referring to FIG. 1, R1, R2, and R3, at 102, 104, and 106, respectively, represent example facial features that may be applied to an image to identify a face, or some portion of a face (illustrated collectively at 110). Various features of a face, such as an edge-like feature (e.g., a nose, eye, lips, etc.) or a ridge-like feature (e.g., cheekbone, chin, underneath the eye, etc.) may be defined by the image strips R1, R2, and/or R3. For example and in one embodiment, an edge-like feature may be described by two back-to-back single image strip regions with the same curve pattern and width (at 112), while a ridge-like feature may consist of three single strip regions (at 110). The detection component 1034 may only process a certain percentage (e.g., 10%) of the image to identify any desired facial features. Given a window, a full set of the image strip features with different curve segments, strip patterns and positions can be built.

Figure 2:
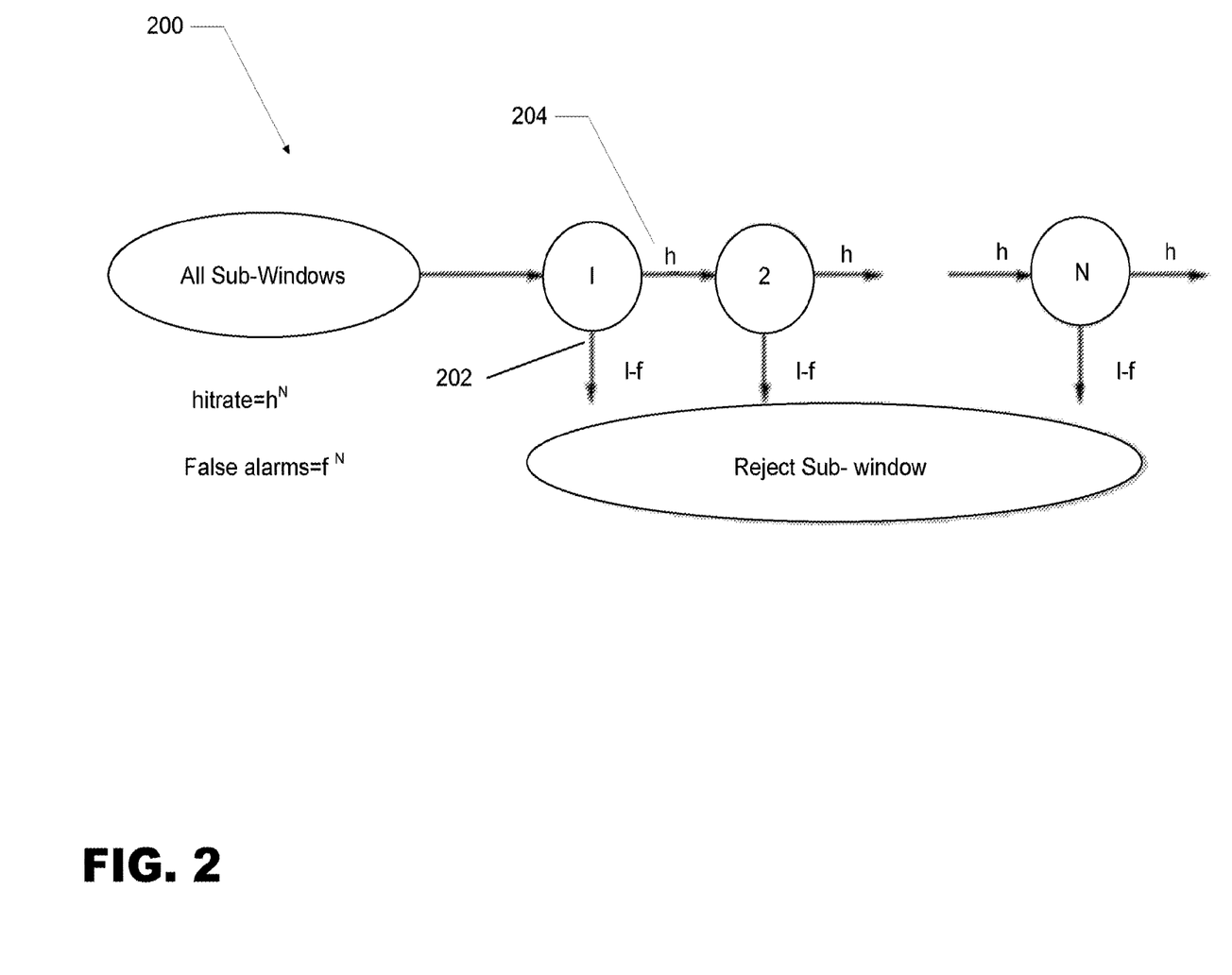
FIG. 2 depicts face detection cascade classifiers, according to aspects of the present disclosure.

According to one embodiment and referring again to step 1006 of FIG. 10A, a cascade classifier may be applied to the image strip features. Generally speaking, a cascade of classifiers represents a degenerated decision tree where at each stage a classifier is trained to detect almost all objects of interest, while rejecting a certain fraction of the non-face patterns. In the context of face detection and/or recognition, the classifiers may be used to detect faces, portions of faces, facial features, and the like. Stated differently, the detection component 1034 applies one or more cascade classifiers to the sequence of images to determine whether a face, portions of a face, and/or features of a face may be detected within the images. In one embodiment, the detection component 1034 outputs a "1" if the region is likely to show the object (i.e., a face), and "0" otherwise. FIG. 2 depicts a process 200 for using a cascade classifier in face detection, according to one embodiment. In particular, there may be a classifier in the each step of face detection, which represents a cascade classifier. In one embodiment, a strong classifier filters out over false alarm f (ex. 0.5) at 202 of the image while preserving h (ex. 0.99) of the faces at 204. Those sub-windows which are not rejected by the initial classifier are processed by a sequence of classifiers, each slightly more complex than the last. If the sub-window is rejected in any step (classifier), no further processing is performed. Any images with identified faces and/or portions of faces are identified and stored in the database 209.

Figure 3A:
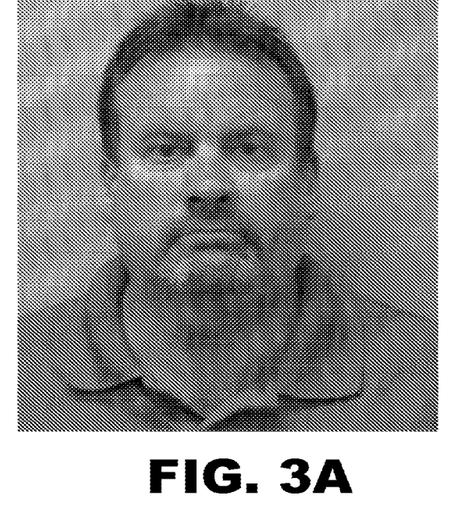
FIGS. 3A-3C are low resolution pictures with resulting facial features detected, according to aspects of the present disclosure.
Figure 3B:
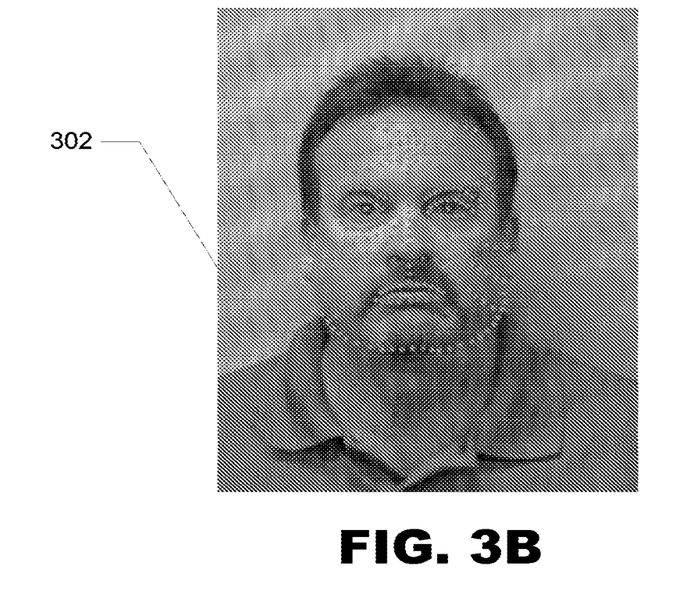
Figure 3C:
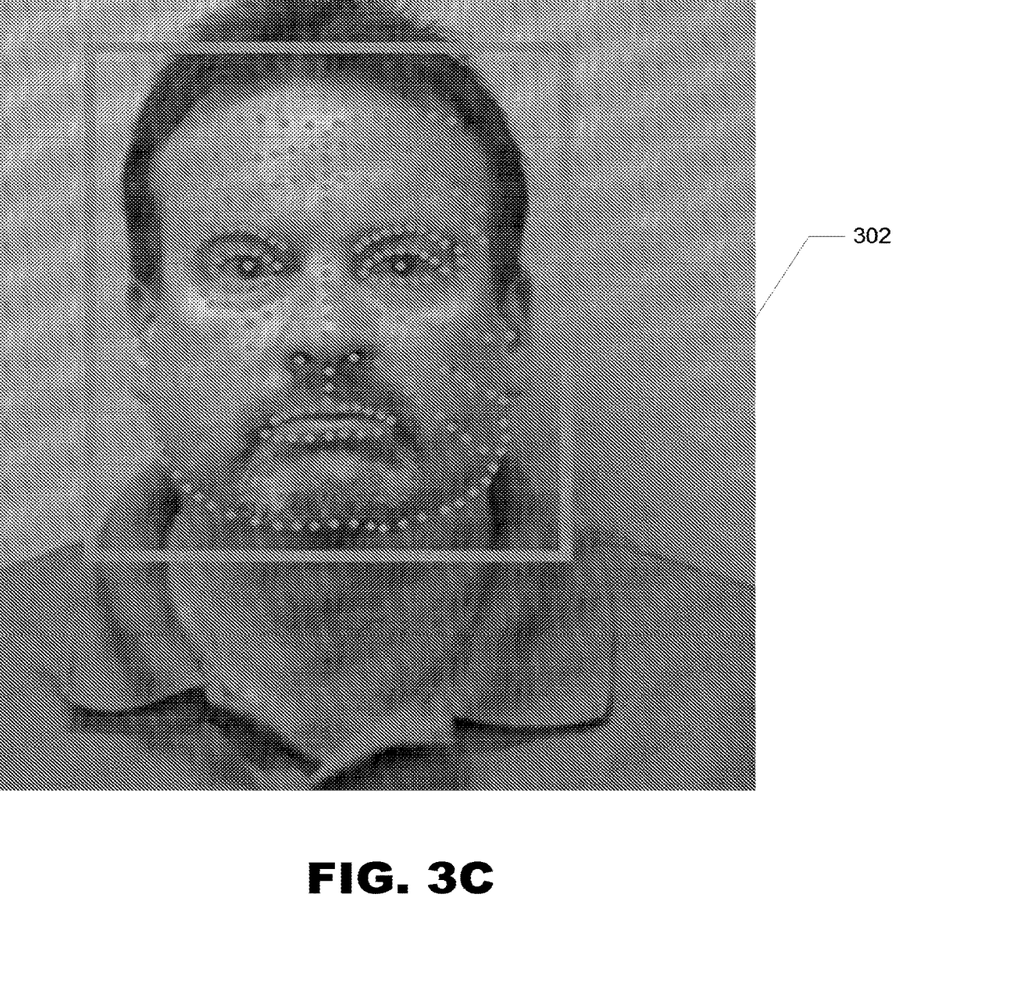
Figure 4A:
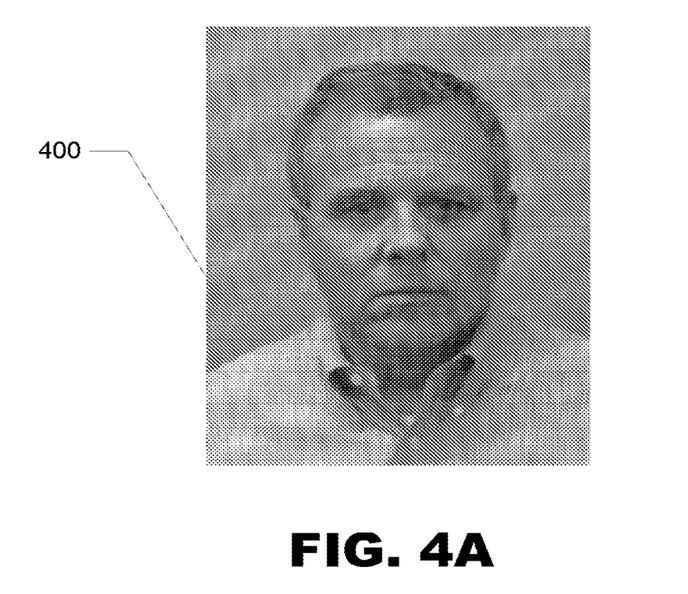
FIGS. 4A-4C are high resolution pictures with resulting facial features detected, according to aspects of the present disclosure.
Figure 4B:
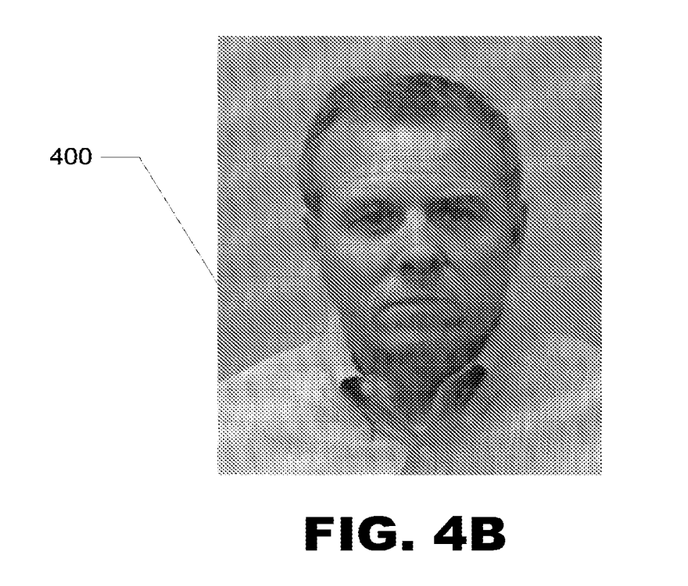
Figure 4C:
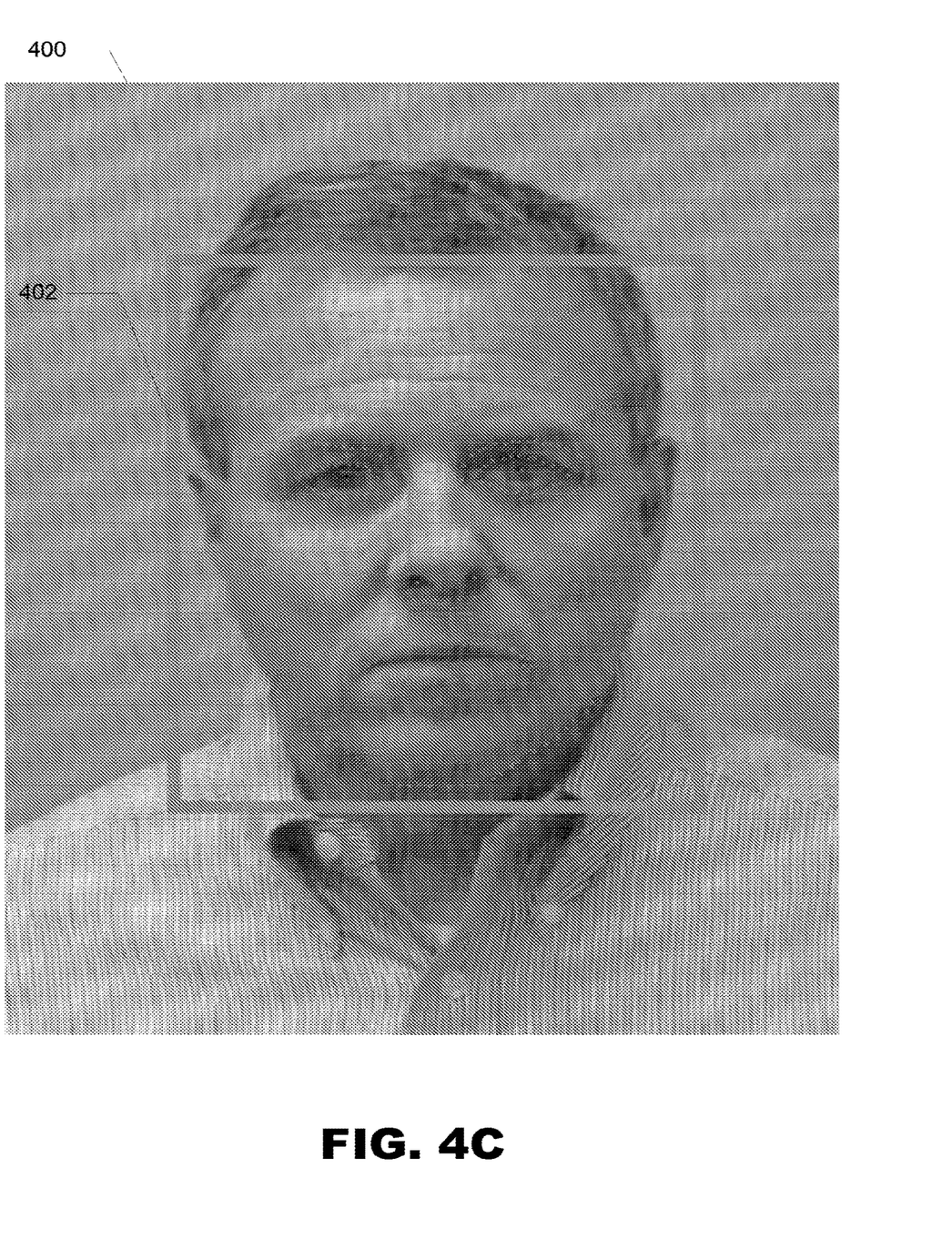

Referring again to FIG. 10A, the images from which a face and/or portions of a face have been detected are used to perform facial recognition tracking (operation 1008). In particular, the detection component 1034 provides an indication of the detected faces and/or portions of faces to a recognition component 1036. Initially, the recognition component 1036 maps the identified faces and/or portions of faces. FIGS. 3A-3C depict facial feature points detected and mapped by the detection component 206 using a low resolution image, according to one embodiment. FIGS. 4A-4C depict facial feature points detected and mapped by the detection component 1036 using a high resolution image. To perform the mapping, as the system identifies ridge-like features and edge-like features, the system generates a point on the original image corresponding to the identified feature (i.e., ridge or edge), as illustrated at 302 of FIGS. 3B and 3C and 402 of FIGS. 4B and 4C.

Next, the detection component 1036 cross-references the mapped images with a set of pre-stored and previously recognized face images in an attempt to determine or otherwise identify a match (operation 1010). Stated differently, the detection component 1036 performs a comparison between the mapping points of the image including the detected face, portion of a face, and/or facial feature, against pre-stored images in the database 209 based on equality percentage. To perform the cross-referencing, the distance between a given mapped point to all additional mapped points and/or portions of the mapped points detected on the face is determined.

Figure 5:
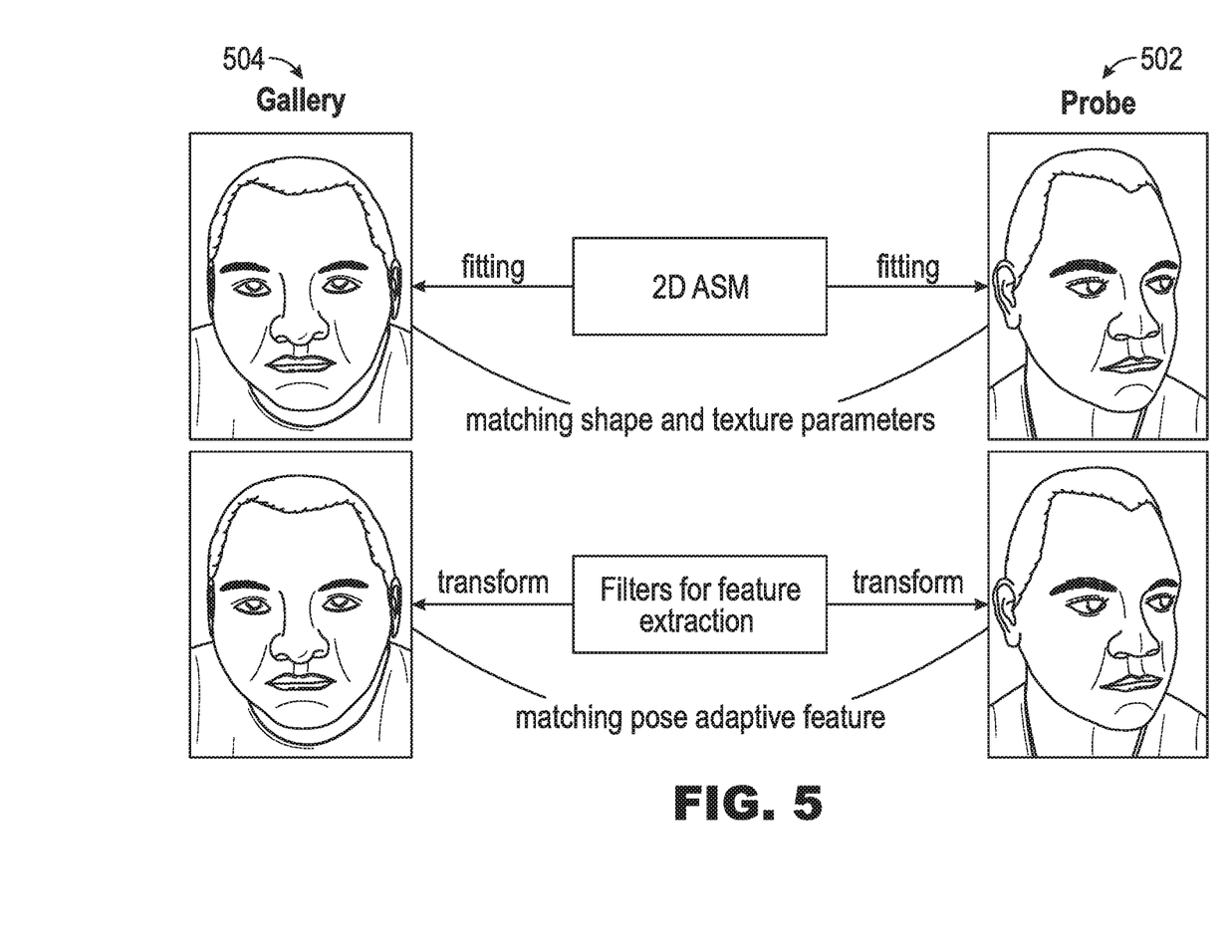
FIG. 5 depicts facial features being extracted on a uniform grid, according to aspects of the present disclosure.
Figure 6:
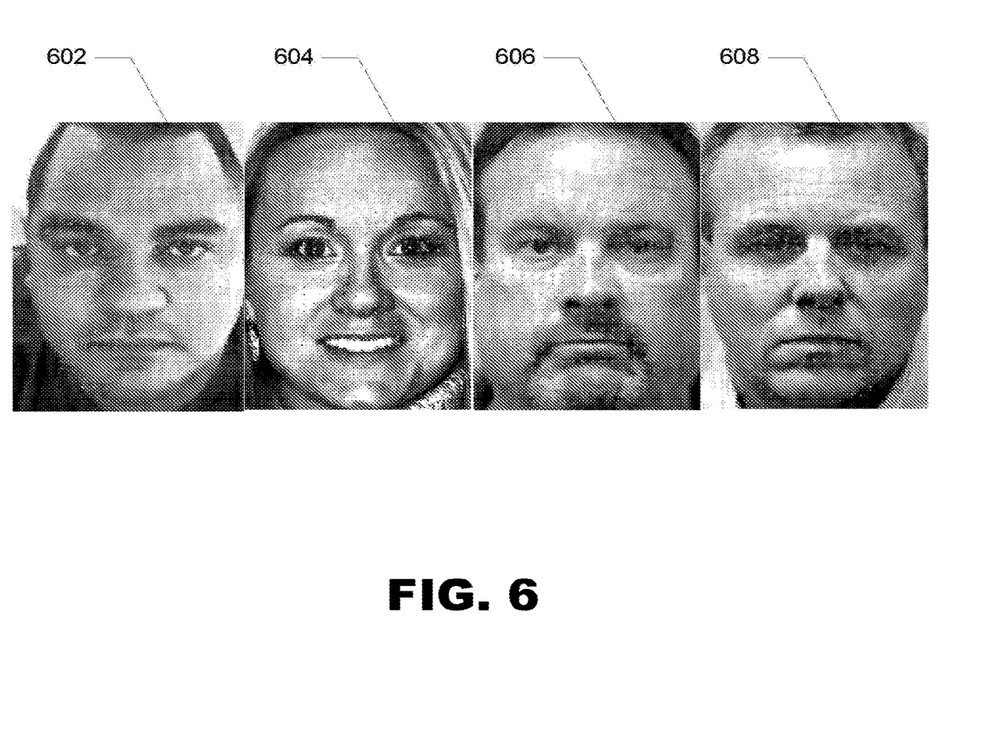
FIG. 6 depicts the face feature points of four photos, according to aspects of the present disclosure.

In particular, the database 209 may set or otherwise establish a match rate percentage that may subsequently be matched. For example, if a match rate percentage of 90% were established, the detection component would perform comparisons between the mapped points of the image with pre-stored images until a match representing 90% of the points (or greater) is satisfied. If the match rate is not satisfied, (e.g., does not meet the 90% requirement) the detection component 1036 will continue to process the mapped images with other pre-stored images stored in the storage 209 (or elsewhere) until a match is found that satisfies the match rate percentage. FIG. 5 illustrates an example of mapping points on a pre-stored image, according to one embodiment. As illustrated, a probe image 502 is compared or otherwise mapped to a pre-stored gallery image 504. In particular, various shapes, edge-like features, texture, shading of the face, etc., will be identified on the probe image 502 by performing a mapping to the gallery image 504. In the illustrated embodiment, the probe image 502 was taken at an angle, so it may require also pose adaptive feature filters to extract more data points, as will be described in more detail below. FIG. 6 provides an illustrative example of face feature points on four different images.

For most face recognition methods, faces, portions of faces, and/or facial features are usually extracted on uniform grid (e.g., FIG. 3), or mapped feature points are defined on an image plane. For in-plane rotation, the uniform grid may easily adapt to the face image by a similarity transformation, but such methodologies may not work for out-of-plane rotation.

Figure 7:
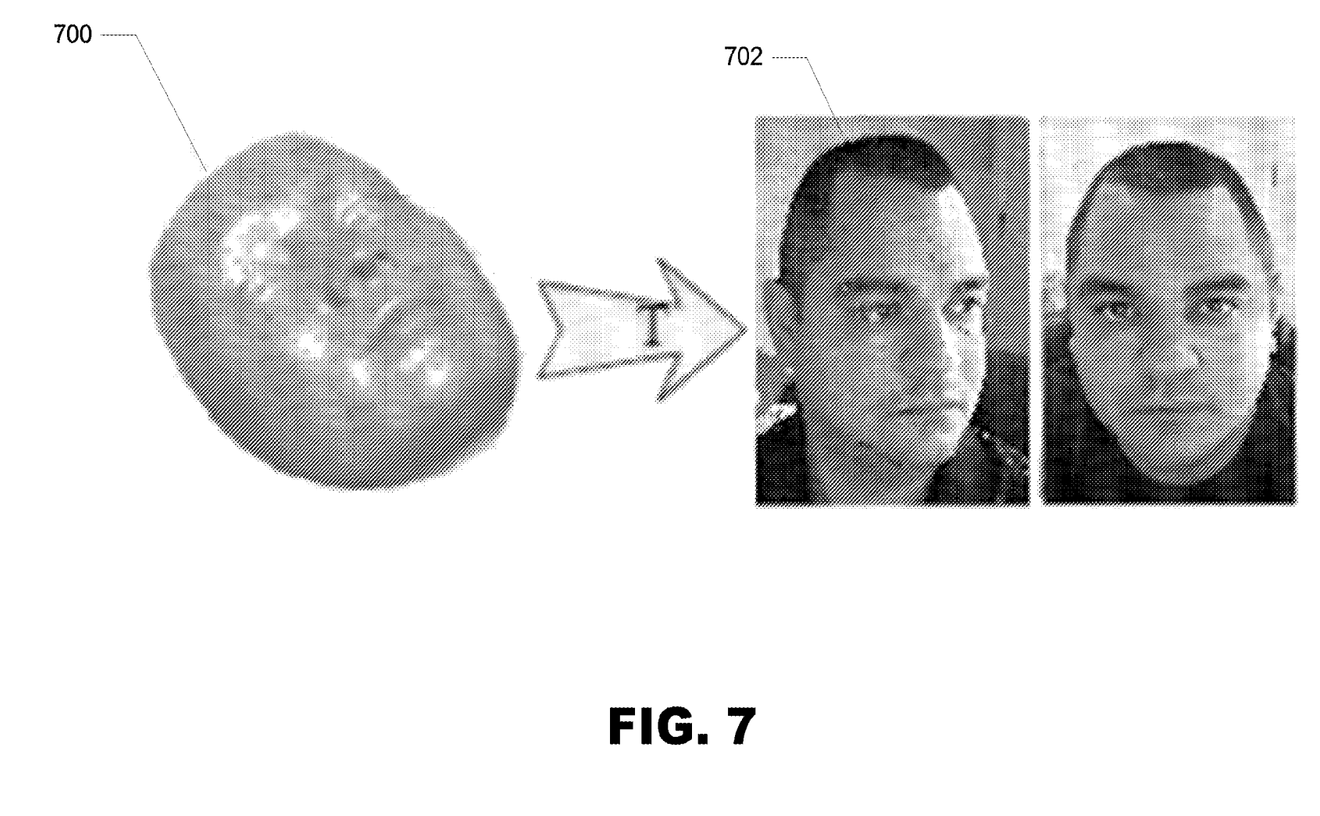
FIG. 7 depicts 3D facial features points being defined on the surface of a 3D face, according to aspects of the present disclosure.

To deal with real three-dimensional (3D) pose variations and with reference to FIG. 7, the recognition component 1036 may define feature points on the surface of a 3D face model 700 with a mean shape "m." In particular, the recognition component 1036 may generate 180 points on image plane 702 (or x-y plane) and project the points from the image plane to the surface of the mean shape "m." Stated differently, a three-dimensional (3D) face model 700 with a mean shape "m" is generated that maps many different feature points on the 3D model, as shown in FIG. 7. To deal with real 3D pose variations and with reference to FIG. 7, the recognition component 1036 determines its pose and shape by fitting the 3D model to the given 2D face image (illustrated at 702) and then projects the defined 3D feature points to the image plane at 704. In one embodiment, by mirroring the points at the right half according to facial symmetry, the recognition component 1036 will determine: 180*2=360 feature points.

The 3D feature points can be represented by their coordinate (x, y, and z) or the index J of vertex on the mean shape "m." To better deal with the non-rigid deformation of the face, the recognition component 1036 uses vertex index. The feature points are extracting local features by a Gabor wavelet, as defined by equation 1.

$$\Psi(k, \sigma) = \frac{k^2}{\sigma^2} e^{-\frac{k^2}{2\sigma^2}x^2} \left\{ e^{ikx} - e^{-\frac{\sigma^2}{2}} \right\} \quad (1)$$

Figure 8:
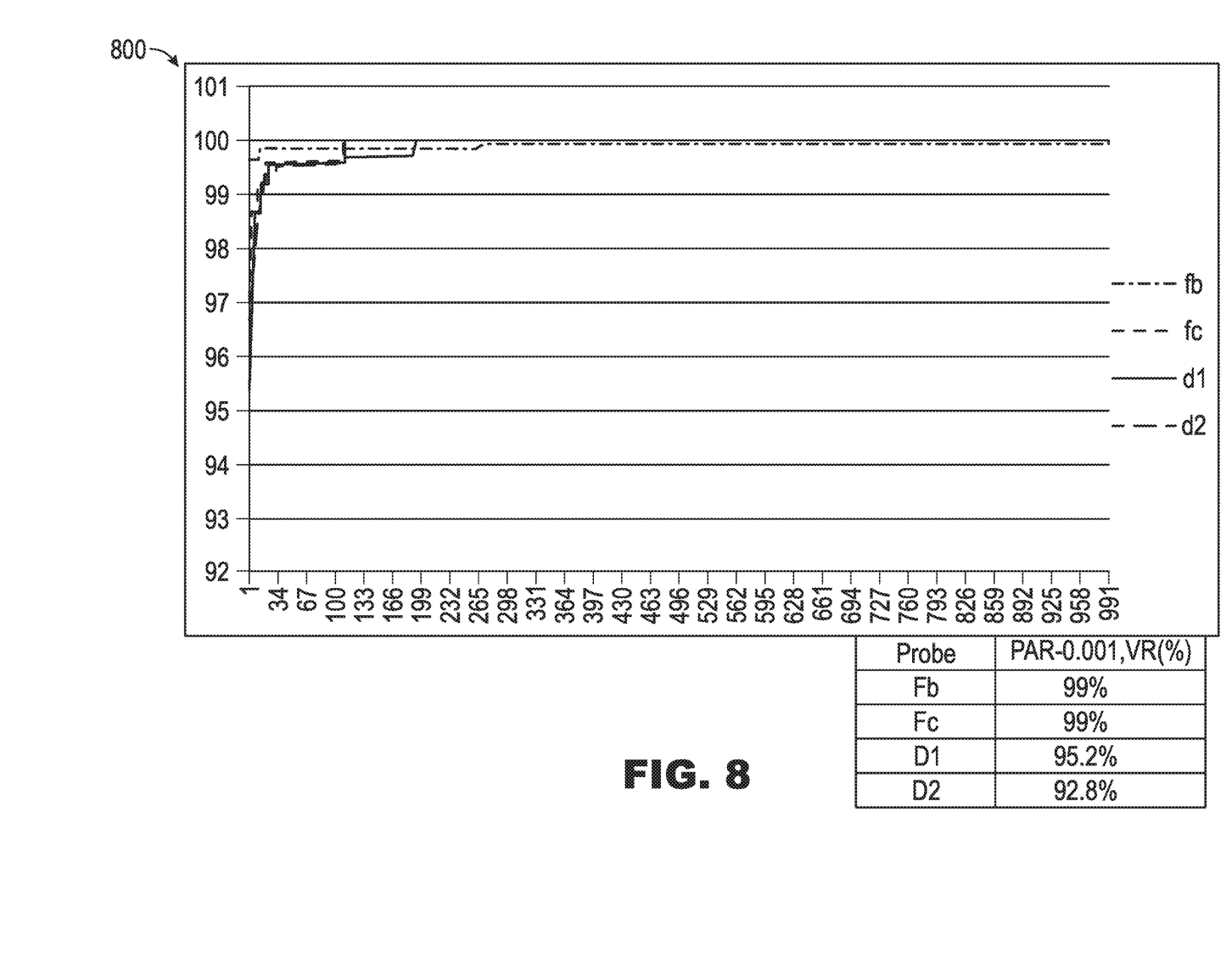
FIG. 8 is a VR curve for a FAR, according to aspects of the present disclosure.

The face feature points are then transformed. The wavelet is a plane wave with wave vector k, restricted by a Gaussian envelope, the size of which relative to the wavelength is parameterized by s. The second term in the brace removes the DC component. In one embodiment, the recognition component 1036 extracts the space of wave vectors k and scale in 8 orientations and 5 resolutions, thus giving 5*8=40 complex values for each feature point. Because the phase information is sensitive to misalignment, it is not used as a feature for face recognition. Merging the feature values at all feature points together and grouping them by left and right halves, results in two feature vectors with 180*40=7200 dimensions for each face image. To reduce the dimensionality of the feature and remove the redundant information, Pose Adaptive Filter is used to learn a low dimensional subspace. The left and right halves are considered as two samples, and only the lesser-occluded half is used for matching. FIG. 8 graphically illustrates a representation of four images fb, fc, d1, and d2, two of which are high resolution and two of which are low-resolution for which more points are allowed and available. The VR % represents the verification rate and FAR represents the false alarm rate.

Referring again to FIG. 10A, the face recognition system may continuously obtain video data from the cameras 1024-1030 and process any detected faces to identify recognized faces contained within the face recognition system database 209. Upon a match, which is set in the software's control panel, an event may be triggered to alert the user of the match. For example, the system may automatically generate a report, summary, or other standardized format of information may be generated provided for display to a user based on a potential match (operation 1006). More particularly and with reference with FIG. 10B, the face recognition system 1022 may process any of the identified matches and/or potential matches into a standardized report structure including some form of master data document. Example embodiments include an e-mail, Internet-accessible formats such as a markup document, pdf, and/or the like. Any of such documents and/or reports may be transmitted from the face recognition system 1022 to a user-device 1042 for access by users.

In one specific embodiment, the face recognition system 1022 may generate an alert email that includes in the email a Camera Name, a Terminal Number indicating the terminal that the email is generated from, a Time stamp of when the event was initiated based on the computer's internal clock and the record source BLOB image along with the captured image. This email notification was designed to make the user aware of a match event has occurred in a terminal.

Figure 9:
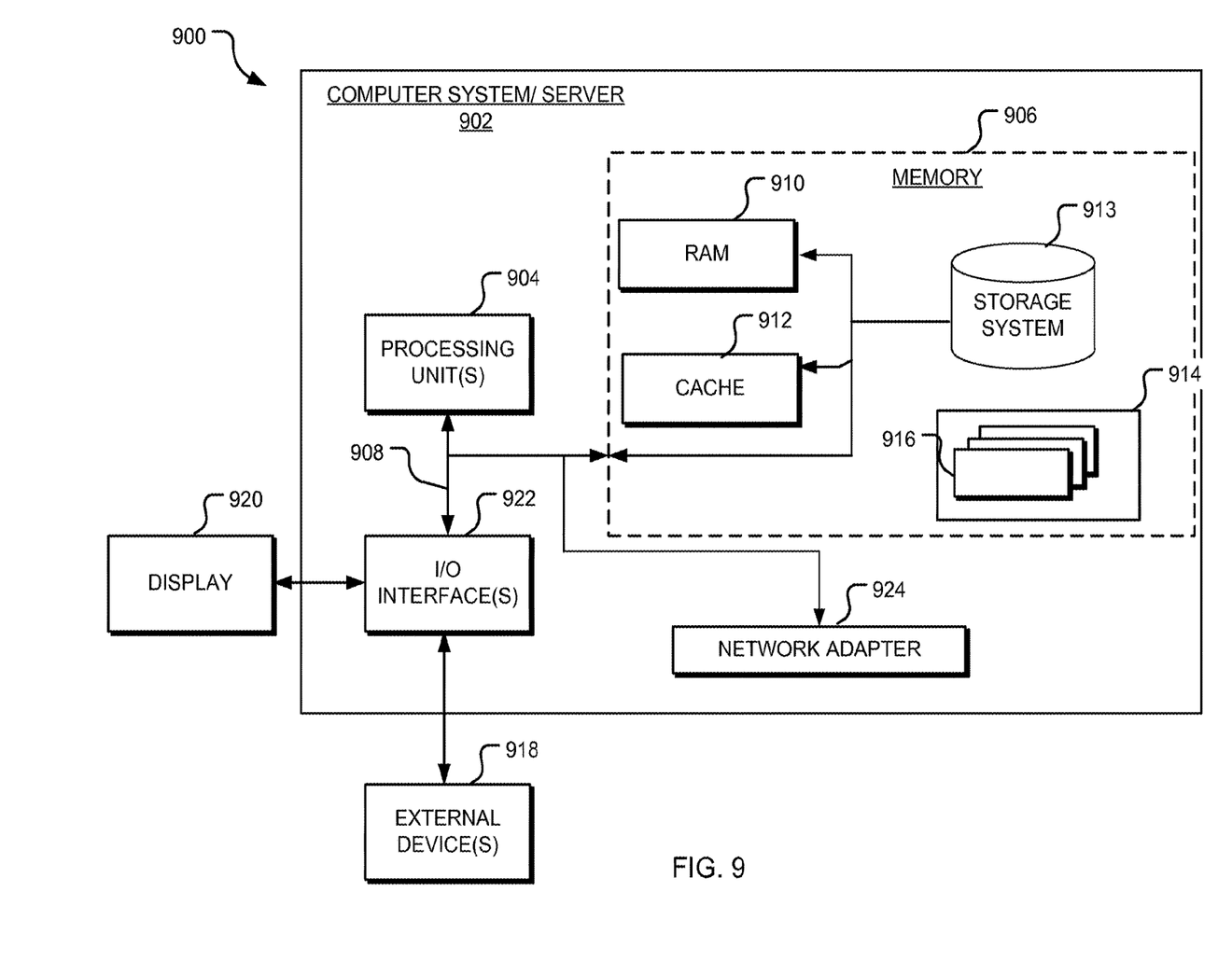
FIG. 9 is an example computing device, according to aspects of the present disclosure.

FIG. 9 illustrates an example of a computing node 900 which may comprise an implementation of the system 1022. The computing node 900 represents one example of a suitable computing device and is not intended to suggest any limitation as to the scope of use or functionality of embodiments of the invention described herein. Regardless, the computing node 900 is capable of being implemented and/or performing any of the functionality described above.

As illustrated, the computer node 900 includes a computer system/server 902, which is operational with numerous other general purpose or special purpose computing system environments or configurations. Examples of well-known computing systems, environments, and/or configurations that may be suitable for use with computer system/server 902 may include personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 902 may be described in the general context of computer system executable instructions, such as program modules, being executed by a computer system. Generally, program modules may include routines, programs, objects, components, logic, data structures, and so on that perform particular tasks or implement particular abstract data types. Computer system/server 902 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 9, computer system/server 902 in computing node 900 is shown in the form of a general-purpose computing device. The components of computer system/server 902 may include one or more processors or processing units 904, a system memory 906, and a bus 908 that couples various system components including system memory 906 to processor 904.

Bus 908 represents one or more of any of several types of bus structures, including a memory bus or memory controller, a peripheral bus, an accelerated graphics port, and a processor or local bus using any of a variety of bus architectures. Such architectures may include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 902 typically includes a variety of computer system readable media. Such media may be any available media that is accessible by computer system/server 902, and it includes both volatile and non-volatile media, removable and non-removable media.

System memory 906 may include computer system readable media in the form of volatile memory, such as random access memory (RAM) 910 and/or cache memory 912. Computer system/server 902 may further include other removable/non-removable, volatile/non-volatile computer system storage media. By way of example only, storage system 913 can be provided for reading from and writing to a non-removable, non-volatile magnetic media (not shown and typically called a "hard drive"). Although not shown, a magnetic disk drive for reading from and writing to a removable, non-volatile optical disk such as a CD-ROM, DVD-ROM or other optical media can be provided. In such instances, each can be connected to bus 908 by one or more data media interfaces. As will be further depicted and described below, memory 906 may include at least one program product having a set (e.g., at least one) of program modules that are configured to carry out the functions of embodiments of the invention.

Program/utility 914, having a set (at least one) of program modules 916, may be stored in memory 906, as well as an operating system, one or more application programs, other program modules, and program data. Each of the operating system, one or more application programs, other program modules, and program data or some combination thereof, may include an implementation of a networking environment. Program modules 916 generally carry out the functions and/or methodologies of embodiments of the invention as described herein.

Computer system/server 902 may also communicate with one or more external devices 918 such as a keyboard, a pointing device, a display 920, etc.; one or more devices that enable a user to interact with computer system/server 902; and/or any devices (e.g., network card, modem, etc.) that enable computer system/server 902 to communicate with one or more other computing devices. Such communication can occur via Input/Output (I/O) interfaces 922. Still yet, computer system/server 902 can communicate with one or more networks such as a local area network (LAN), a general wide area network (WAN), and/or a public network (e.g., the Internet) via network adapter 924. As depicted, network adapter 924 communicates with the other components of computer system/server 902 via bus 908. It should be understood that although not shown, other hardware and/or software components could be used in conjunction with computer system/server 902. Examples, include, but are not limited to: microcode, device drivers, redundant processing units, and external disk drive arrays, RAID systems, tape drives, and data archival storage systems, etc.

The embodiments of the present disclosure described herein are implemented as logical steps in one or more computer systems. The logical operations of the present disclosure are implemented (1) as a sequence of processor-implemented steps executing in one or more computer systems and (2) as interconnected machine or circuit engines within one or more computer systems. The implementation is a matter of choice, dependent on the performance requirements of the computer system implementing aspects of the present disclosure. Accordingly, the logical operations making up the embodiments of the disclosure described herein are referred to variously as operations, steps, objects, or engines. Furthermore, it should be understood that logical operations may be performed in any order, unless explicitly claimed otherwise or a specific order is inherently necessitated by the claim language.

The foregoing merely illustrates the principles of the disclosure. Various modifications and alterations to the described embodiments will be apparent to those skilled in the art in view of the teachings herein. It will thus be appreciated that those skilled in the art will be able to devise numerous systems, arrangements and methods which, although not explicitly shown or described herein, embody the principles of the disclosure and are thus within the spirit and scope of the present disclosure. From the above description and drawings, it will be understood by those of ordinary skill in the art that the particular embodiments shown and described are for purposes of illustrations only and are not intended to limit the scope of the present disclosure. References to details of particular embodiments are not intended to limit the scope of the disclosure.

What is claimed is:

1. A server computing device comprising:
   memory storing computer-readable instructions; and
   at least one processor to execute the computer-readable instructions to:
   receive video data from a surveillance system having at least one IP camera, the video data comprising a sequence of images and store the sequence of images in a database;
   detect by a detection component at least a portion of a face from the sequence of images;
   generate by the detection component a mapping of facial points corresponding to the at least the portion of the face from the sequence of images by generating a plurality of points on an image plane corresponding to the sequence of images and determining a distance between each point to the plurality of points, each point corresponding to at least one of an edge-like feature of the face and a ridge-like feature of the face;
   apply by the detection component a cascade of classifiers between the mapping of facial points against each facial image of the set of pre-stored and previously recognized facial images;
   cross-reference the mapping of facial points with each facial image of a set of pre-stored and previously recognized facial images to perform one of recognizing the face and not recognizing the face by a recognition component; and
   automatically generate information associated with the face and transmit the information associated with the face to a client computing device.

2. The server computing device of claim 1, the detection component further to provide an indication of recognizing the face to the recognition component.

3. The server computing device of claim 1, the detection component further to perform a comparison between the mapping of facial points against each facial image of the set of pre-stored and previously recognized facial images.

4. The server computing device of claim 1, the detection component further to perform a comparison between the mapping of facial points against each facial image of the set of pre-stored and previously recognized facial images based on an equality percentage.

5. The server computing device of claim 1, the recognition component further to determine that the sequence of images was taken at an angle and determine that there are three-dimensional pose variations in the sequence of images.

6. The server computing device of claim 5, the recognition component further to generate a three-dimensional face model by mapping a two-dimensional representation of the facial points detected and mapped by the detection component to the three-dimensional facial model.

7. The server computing device of claim 1, wherein the server computing device comprises a distributed cloud server computing device.

8. A method comprising:
receiving, by at least one processor, video data from a surveillance system having at least one IP camera, the video data comprising a sequence of images and storing the sequence of images in a database;
detecting, by a detection component, at least a portion of a face from the sequence of images;
generating, by the detection component, a mapping of facial points corresponding to the at least the portion of the face from the sequence of images by generating a plurality of points on an image plane corresponding to the sequence of images and determining a distance between each point to the plurality of points, each point corresponding to at least one of an edge-like feature of the face and a ridge-like feature of the face;
applying, by the detection component, a cascade of classifiers between the mapping of facial points against each facial image of the set of pre-stored and previously recognized facial images;
cross-referencing the mapping of facial points with each facial image of a set of pre-stored and previously recognized facial images to perform one of recognizing the face and not recognizing the face by a recognition component; and
automatically generating information associated with the face and transmitting the information associated with the face to a client computing device.

9. The method of claim 8, the detection component further to provide an indication of recognizing the face to the recognition component.

10. The method of claim 8, the detection component further to perform a comparison between the mapping of facial points against each facial image of the set of pre-stored and previously recognized facial images.

11. The method of claim 8, the detection component further to perform a comparison between the mapping of facial points against each facial image of the set of pre-stored and previously recognized facial images based on an equality percentage.

12. The method of claim 8, the recognition component further to determine that the sequence of images was taken at an angle and determine that there are three-dimensional pose variations in the sequence of images.

13. The method of claim 12, the recognition component further to generate a three-dimensional face model by mapping a two-dimensional representation of the facial points detected and mapped by the detection component to the three-dimensional facial model.

14. A non-transitory computer-readable medium having instructions stored thereon, the instructions when executed by at least one processor, cause the processor to perform operations comprising:
receiving video data from a surveillance system having at least one IP camera, the video data comprising a sequence of images and storing the sequence of images in a database;
detecting, by a detection component, at least a portion of a face from the sequence of images;
generating, by the detection component, a mapping of facial points corresponding to the at least the portion of the face from the sequence of images by generating a plurality of points on an image plane corresponding to the sequence of images and determining a distance between each point to the plurality of points, each point corresponding to at least one of an edge-like feature of the face and a ridge-like feature of the face;
applying, by the detection component, a cascade of classifiers between the mapping of facial points against each facial image of the set of pre-stored and previously recognized facial images;
cross-referencing the mapping of facial points with each facial image of a set of pre-stored and previously recognized facial images to perform one of recognizing the face and not recognizing the face by a recognition component; and
automatically generating information associated with the face and transmitting the information associated with the face to a client computing device.

15. The non-transitory computer-readable medium of claim 14, the detection component further to provide an indication of recognizing the face to the recognition component.

16. The non-transitory computer-readable medium of claim 14, the detection component further to perform a comparison between the mapping of facial points against each facial image of the set of pre-stored and previously recognized facial images.

17. The non-transitory computer-readable medium of claim 14, the detection component further to perform a comparison between the mapping of facial points against each facial image of the set of pre-stored and previously recognized facial images based on an equality percentage.

18. The non-transitory computer-readable medium of claim 14, the recognition component further to determine that the sequence of images was taken at an angle and determine that there are three-dimensional pose variations in the sequence of images.

19. The non-transitory computer-readable medium of claim 18, the recognition component further to generate a three-dimensional face model by mapping a two-dimensional representation of the facial points detected and mapped by the detection component to the three-dimensional facial model.

* * * * *